US012699395B2

(12) United States Patent     (10) Patent No.:     US 12,699,395 B2
Koike et al.     (45) Date of Patent:     Aug. 4, 2026

(54) OBJECT DETECTION PROBABILITY CALCULATING APPARATUS, OBJECT DETECTION PROBABILITY CALCULATING METHOD, AND PROGRAM

(71) Applicant: NTT, Inc., Tokyo (JP)

(72) Inventors: Masanori Koike, Tokyo (JP); Kazuhisa Yamagishi, Tokyo (JP); Noritsugu Egi, Tokyo (JP); Masahiro Yokota, Tokyo (JP)

(73) Assignee: NTT, Inc., Tokyo (JP)

( * ) Notice: Subject to any disclaimer, the term of this patent is extended or adjusted under 35 U.S.C. 154(b) by 0 days.

(21) Appl. No.: 18/871,601

(22) PCT Filed: Jul. 25, 2023

(86) PCT No.: PCT/JP2023/027164
§ 371 (c)(1),
(2) Date: Dec. 4, 2024

(87) PCT Pub. No.: WO2024/024776
PCT Pub. Date: Feb. 1, 2024

(65) Prior Publication Data
US 2025/0341830 A1     Nov. 6, 2025

(30) Foreign Application Priority Data

Jul. 29, 2022   (WO) .................. PCT/JP2022/029392

(51) Int. Cl.
| | |
|---|---|
| *H04N 7/18* | (2006.01) |
| *G05D 1/224* | (2024.01) |
| *G06V 10/98* | (2022.01) |
| *G06V 20/58* | (2022.01) |
| *G05D 105/22* | (2024.01) |

(52) U.S. Cl.
CPC ........... *G05D 1/2247* (2024.01); *G06V 10/98* (2022.01); *G06V 20/58* (2022.01); *G05D 2105/22* (2024.01)

(58) Field of Classification Search
CPC .... H04N 7/18; G05D 1/2247; G05D 2105/22; G06V 20/58; G06V 10/98
(Continued)

(56) References Cited

U.S. PATENT DOCUMENTS

| | | | | |
|---|---|---|---|---|
| 9,378,422 B2 * | 6/2016 | Saruta | .................... | G06V 20/10 |
| 10,970,870 B2 * | 4/2021 | Ozawa | ...................... | G06T 7/70 |

(Continued)

FOREIGN PATENT DOCUMENTS

| | | |
|---|---|---|
| JP | 2017-184159 | 10/2017 |
| JP | 2021-039687 | 3/2021 |

(Continued)

OTHER PUBLICATIONS

ITS/automatic traveling promotion section of automobile section of Manufacturing Industry Department, Ministry of Industry, "Supplementary explanation materials for evaluation at the end of a research and development/demonstration project for social implementation of advanced automatic traveling/MaaS, etc.", Mar. 31, 2021.
(Continued)

*Primary Examiner* — Trang U Tran
(74) *Attorney, Agent, or Firm* — IPUSA, PLLC

(57)     ABSTRACT

An object detection probability calculating apparatus includes a processor; and a memory storing instructions that cause the processor to execute a process. The process includes calculating an object detection probability indicating a probability at which a person is able to detect a predetermined object appearing in an image, based on a parameter of image quality acquired from a camera provided at a moving body capable of automatic movement and distance information indicating a distance from the moving body or the camera to the predetermined object.

9 Claims, 6 Drawing Sheets

(58) Field of Classification Search
USPC ............................................................ 348/148
See application file for complete search history.

(56)                     References Cited

U.S. PATENT DOCUMENTS 11,314,972 B2 *  4/2022  Cho ..................... G06V 10/145
2023/0245559 A1    8/2023  Kobayashi et al.

FOREIGN PATENT DOCUMENTS

| JP | 2021-064139 | 4/2021 |
| WO | 2022/009263 | 1/2022 |

OTHER PUBLICATIONS

Automobile Bureau of the Ministry of Land, Infrastructure, "Transport and Tourism, Guidelines for passenger automobile transportation business operators to ensure safety and convenience in unmanned automated driving moving service in limited area", Jun. 2019.

Author: Unknown, ITU-T, "Video quality assessment of streaming services over reliable transport for resolutions up to 4K", p. 1204, Jan. 2020.

Jenkin Robin et al: "Fundamental Imaging System Analysis for Autonomous Vehicles", Electronic Imaging, vol. 30, No. 17, Jan. 28, 2018 (Jan. 28, 2018), pp. 1-10, XP093338071, US.

* cited by examiner

OBJECT DETECTION PROBABILITY CALCULATING APPARATUS, OBJECT DETECTION PROBABILITY CALCULATING METHOD, AND PROGRAM

TECHNICAL FIELD

The present disclosure relates to a technique for calculating a detection probability of an object detected by an operator in a monitoring center that monitors automated driving.

BACKGROUND ART

The market scale of automated driving of automobiles is expanding due to development of communication technologies, improvement of accuracy of sensors mounted on automobiles, improvement of control technologies of automated driving, and the like. In the automated driving technology, the automated driving is classified into stages Lv.1 to Lv.5 according to the level of the automated driving. In Lv.1 and Lv.2, the entity responsible for driving is a driver, and the automated driving system performs lane keeping assist, braking, and the like, but the automated driving system is handled as an auxiliary, and the driver is responsible for driving.

On the other hand, in the automated driving of Lv.3 to Lv.5, the automated driving system of the automobile basically performs the driving, and the entity responsible for the driving is the system. In the automated driving of Lv.4, the driver is not required under a specific condition, and it is possible to reduce accidents due to mistakes when a human drives, but it is considered that an accident due to a system error may also occur.

Therefore, as means for responding to a system error, it has been studied that an image by a monitoring camera of automated driving is remotely monitored, and an operator in a monitoring center remotely operates an automobile according to a situation (Non Patent Literature 1). Furthermore, in the guidelines of the Ministry of Land, Infrastructure, Transport and Tourism (Non Patent Literature 2), it is described that, when automated driving is performed, it is necessary to ensure the safety of driving by setting an appropriate route and area after various hazards and the like generated regarding driving of the automobile have been reliably recognized. Therefore, in a case where the operator in the monitoring center monitors a monitoring image, which is the image transmitted from the monitoring camera of the automated driving, it is necessary to appropriately respond to a situation that becomes dangerous during driving. For example, in a case where a person, an animal, an object, or the like jumps out on a road, or an object that may cause a collision is placed on the road, or the like, it is necessary for the operator to appropriately recognize the person, the animal, the object, or the like that hinders driving, and to perform control to stop the automobile by the remote operation or the like.

On the other hand, in a situation in which the automobile performs the automated driving and transmits the monitoring image to the monitoring center in real time, there is a problem that the monitoring image is affected by the band fluctuation of the wireless communication, and the image quality may deteriorate. In a case where the image quality of the monitoring image deteriorates, the operator in the monitoring center cannot detect an object that hinders driving, which may lead to an accident. Therefore, in a case where the image quality does not satisfy a predetermined criterion in the automated driving, it is considered that a response such as stopping the automobile in advance is necessary. In order to determine the criterion of the image quality for detecting the object, it is necessary to check a value of an object detection probability when a parameter affecting the quality of an image such as a bit rate is input. Recommendation P.1204 (Non Patent Literature 3) is established from ITU-T as a method for estimating the quality perceived by a user from the bit rate of a transmission image. On the other hand, in object detection in automated driving, the image quality for a user to perceive a general transmission image is insufficient, and the image quality required when the operator detects an object from the monitoring image is required.

CITATION LIST

Non Patent Literature

Non Patent Literature 1: Supplementary explanation materials for evaluation at the end of a research and development/demonstration project for social implementation of advanced automatic traveling/MaaS, etc., 2021, ITS/automatic traveling promotion section of automobile section of Manufacturing Industry Department, Ministry of Industry Non Patent Literature 2: Guidelines for passenger automobile transportation business operators to ensure safety and convenience in unmanned automated driving moving service in limited area, Automobile Bureau of the Ministry of Land, Infrastructure, Transport and Tourism Non Patent Literature 3: P.1204: Video quality assessment of streaming services over reliable transport for resolutions up to 4K, ITU-T, 2020

SUMMARY OF INVENTION

Technical Problem

However, in the transmission of the monitoring image in the conventional automated driving, the image quality of the monitoring image transmitted from the automobile may deteriorate due to a change in a wireless band or the like. In such a case, the automated driving may be continued while the detection probability of an object by the operator is low. For example, on a display of the monitoring center, a screen is divided, and the monitoring images by multiple automobiles are simultaneously displayed to be small. Therefore, the operator in the monitoring center may not notice that the image quality has deteriorated.

In addition, when an object is detected by using the monitoring image, it is necessary to consider a distance between the object and the automobile. For example, since an object appears larger in the image as the position of the object is closer to the automobile, the detection probability of the object by the operator may not be reduced even if the image quality has deteriorated.

The present invention has been made in view of the above circumstances, and an object thereof is to obtain a detection probability of an object by an operator in a monitoring center.

Solution to Problem

To achieve the above object, an invention according to a first aspect is an object detection probability calculating apparatus configured to calculate an object detection probability indicating a probability at which a person is able to detect a predetermined object appearing in an image, based on a parameter of image quality acquired from an image capturing unit provided at a moving body capable of automatic movement and distance information indicating a distance from the moving body or the image capturing unit to the predetermined object.

Advantageous Effects of Invention

As described above, according to the present invention, it is possible to exhibit an effect of obtaining a detection probability of an object by an operator in a monitoring center.

DESCRIPTION OF EMBODIMENTS

Hereinafter, an embodiment of the present invention will be described with reference to the drawings.

System Configuration of Embodiment

Figure 1:
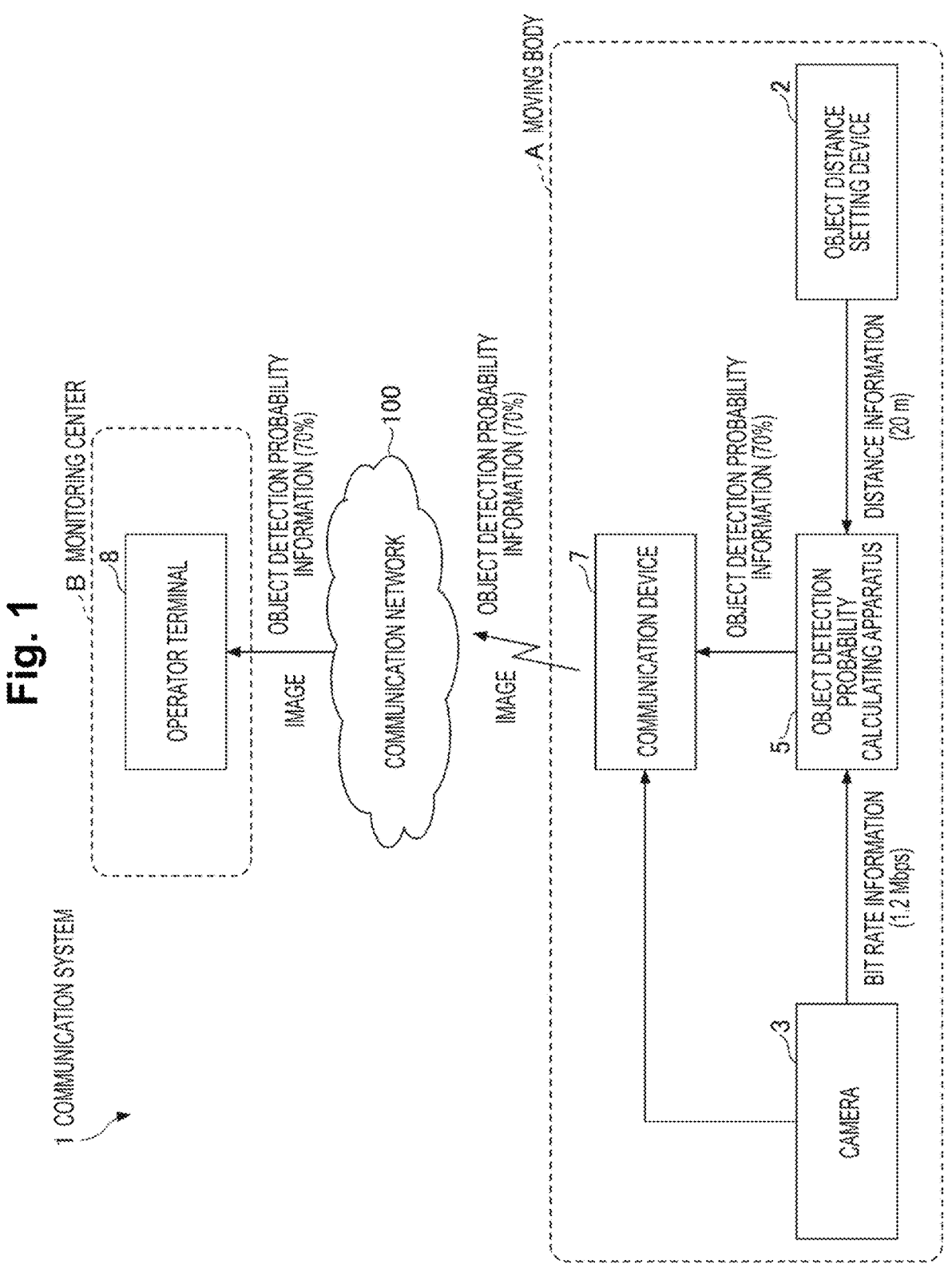
FIG. 1 is an overall configuration diagram of a communication system according to an embodiment.

An outline of a configuration of a communication system according to an embodiment will be described with reference to FIG. 1. FIG. 1 is an overall configuration diagram of the communication system according to the embodiment. Note that values (1.2 Mbps, 20 m, 70%) illustrated in FIG. 1 are an example, and the embodiment is not limited to these values.

As illustrated in FIG. 1, a communication system 1 is constructed by a camera 3 and each device (object distance setting device 2, object detection probability calculating apparatus 5, and communication device 7), which are mounted on a moving body A such as a vehicle, and an operator terminal 8 placed on a remote monitoring center B side.

Figure 6:
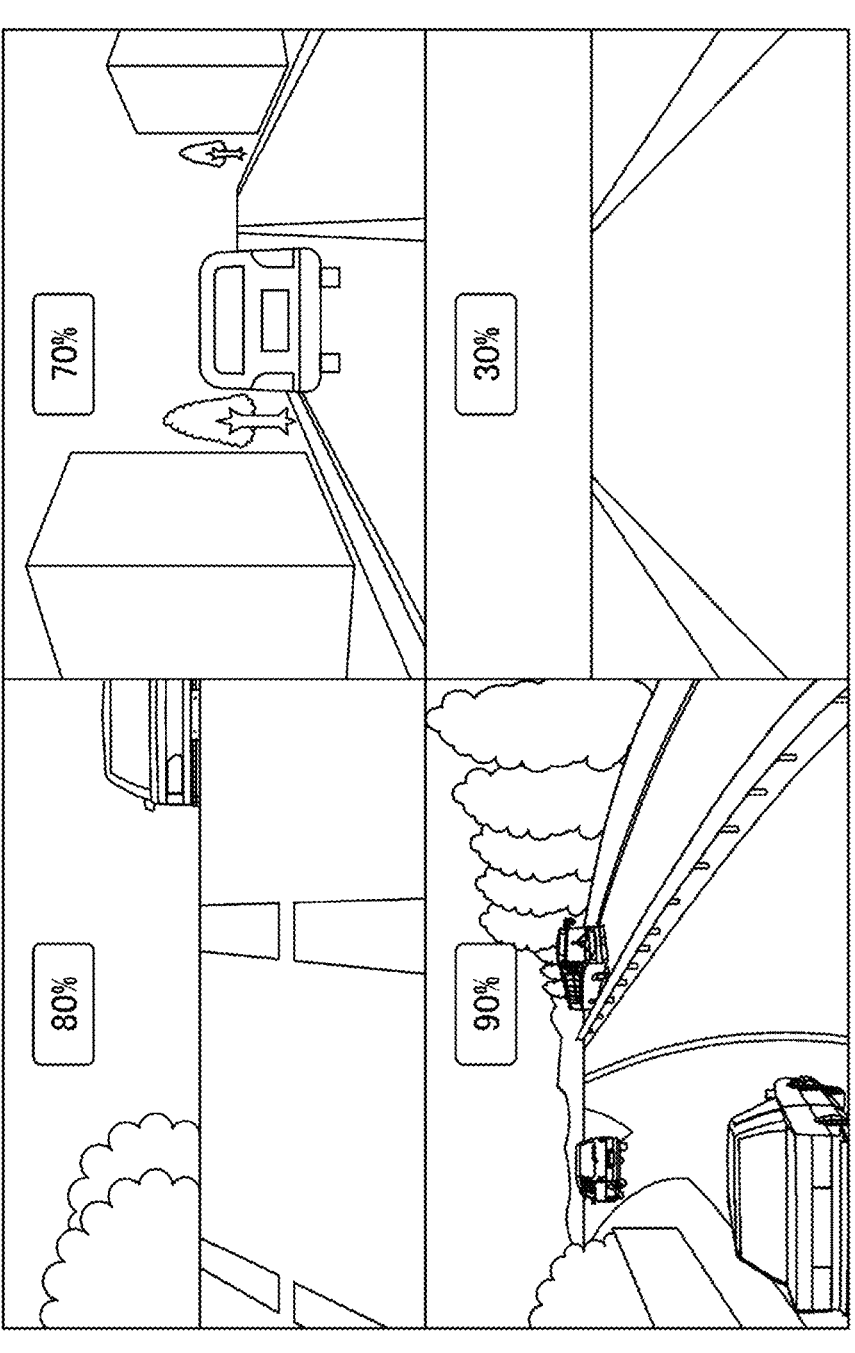
FIG. 6 is a view illustrating a display screen example by an operator terminal in a monitoring center.

Basically, the moving body A performs automated driving, but when the operator terminal 8 in the monitoring center B displays images from a plurality of moving bodies as illustrated in FIG. 6, an operator in the monitoring center B can monitor the moving situation of each automobile, and can remotely operate a specific moving body according to the moving situation. As a result, the operator can remotely avoid an accident in a case where an object or a person that hinders driving jumps out at the time of viewing an image from a predetermined moving body.

Note that a plurality of the object distance setting devices 2, a plurality of the cameras 3, a plurality of the object detection probability calculating apparatuses 5, a plurality of the communication devices 7, and a plurality of the operator terminals 8 may be provided. In particular, four or more cameras 3 may be provided to capture images of the front side, the right side surface, the left side surface, and the rear side of the moving body A.

In the present embodiment, the moving body A is assumed to be, for example, a vehicle (automobile) having a communication function and an automated driving function. However, the moving body A is not limited to the automobile, and may be an agricultural machine such as a tractor having the communication function and the automated driving function. In addition to the vehicle, the moving body may be a ship, an aircraft, or the like.

Among the components, the object distance setting device 2 is a device that sets distance information used for the object detection probability calculating apparatus 5 to calculate an object detection probability. The distance information indicates a distance between the moving body A (or the camera 3) and an object, and is, for example, a predetermined fixed value such as 10 m, 20 m, or 30 m. However, the distance information may have a value designated by the operator in the monitoring center B, or may have a value set by the moving situation of the moving body A or the like.

The camera 3 is a monitoring camera or the like mounted on the moving body A. The camera 3 that captures an image of the outside of the moving body transmits image data obtained by image capturing to the operator terminal 8 in the monitoring center B via the communication device 7. Further, the camera 3 extracts a bit rate of the image from encoding information of the camera, and transmits bit rate information to the object detection probability calculating apparatus 5.

Figure 2:
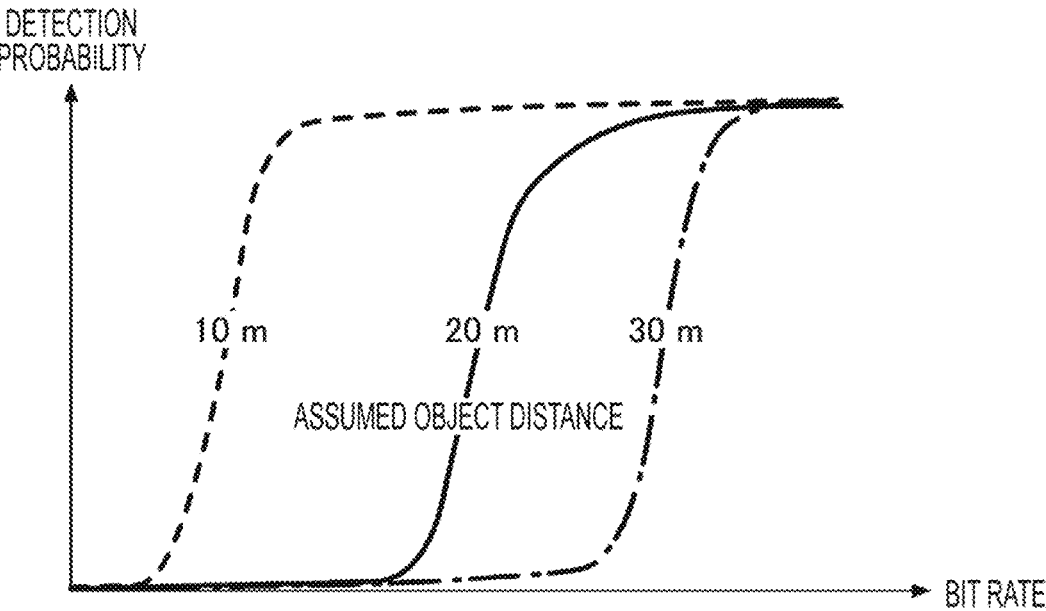
FIG. 2 is a diagram illustrating an example of a model of an object detection probability estimated by using a bit rate of an image and a distance to an object.

The object detection probability calculating apparatus 5 calculates the object detection probability based on the bit rate information acquired from the camera 3 and the distance information acquired from the object distance setting device 2 by using a model of the object detection probability as illustrated in FIG. 2. The object detection probability indicates a probability at which a person (healthy person) can detect a predetermined object appearing in an image. Then, the object detection probability calculating apparatus 5 transmits object detection probability information indicating the calculated object detection probability to the operator terminal 8 in the monitoring center B via the communication device 7.

FIG. 2 is a diagram illustrating an example of the model of the object detection probability estimated by using the bit rate of an image and a distance to an object. The horizontal axis of the graph represents the bit rate of the monitoring image, and the vertical axis represents the detection probability of the object, and a quality estimation graph is created for each distance between the moving body A (or the camera 3) and the object. In a case where the distance between the moving body A (or the camera 3) and the object is short, the object appears large, and thus the detection probability is increased. In addition, the detection probability is increased as the input image bit rate becomes higher.

Note that a detailed calculation method of the object detection probability performed by the object detection probability calculating apparatus 5 will be described later.

The communication device 7 can perform data communication with the operator terminal 8 via a communication network 100. The communication network 100 is constructed with a mobile network, the Internet, or the like. In addition, the Internet includes the space Internet through a space using an artificial satellite or the like.

The operator terminal 8 is a terminal such as a personal computer (PC) used by the operator in the monitoring center B.

With the configuration described above, the bit rate information transmitted from the camera 3 is transmitted to the object detection probability calculating apparatus 5. The distance information transmitted from the object distance setting device 2 is also transmitted to the object detection probability calculating apparatus 5. Further, the image data transmitted from the camera 3 is transmitted to the operator terminal 8 via the communication device 7. The object detection probability information indicating the object detection probability calculated by the object detection probability calculating apparatus 5 is transmitted from the object detection probability calculating apparatus 5 and transmitted to the operator terminal 8 via the communication device 7.

Note that the object distance setting device 2 may be provided on the monitoring center B side. In this case, the distance information transmitted from the object distance setting device 2 is transmitted to the object detection probability calculating apparatus 5 via a new communication device installed on the monitoring center B side and then the communication device 7 on the moving body A side.

Hardware Configuration

Figure 3:
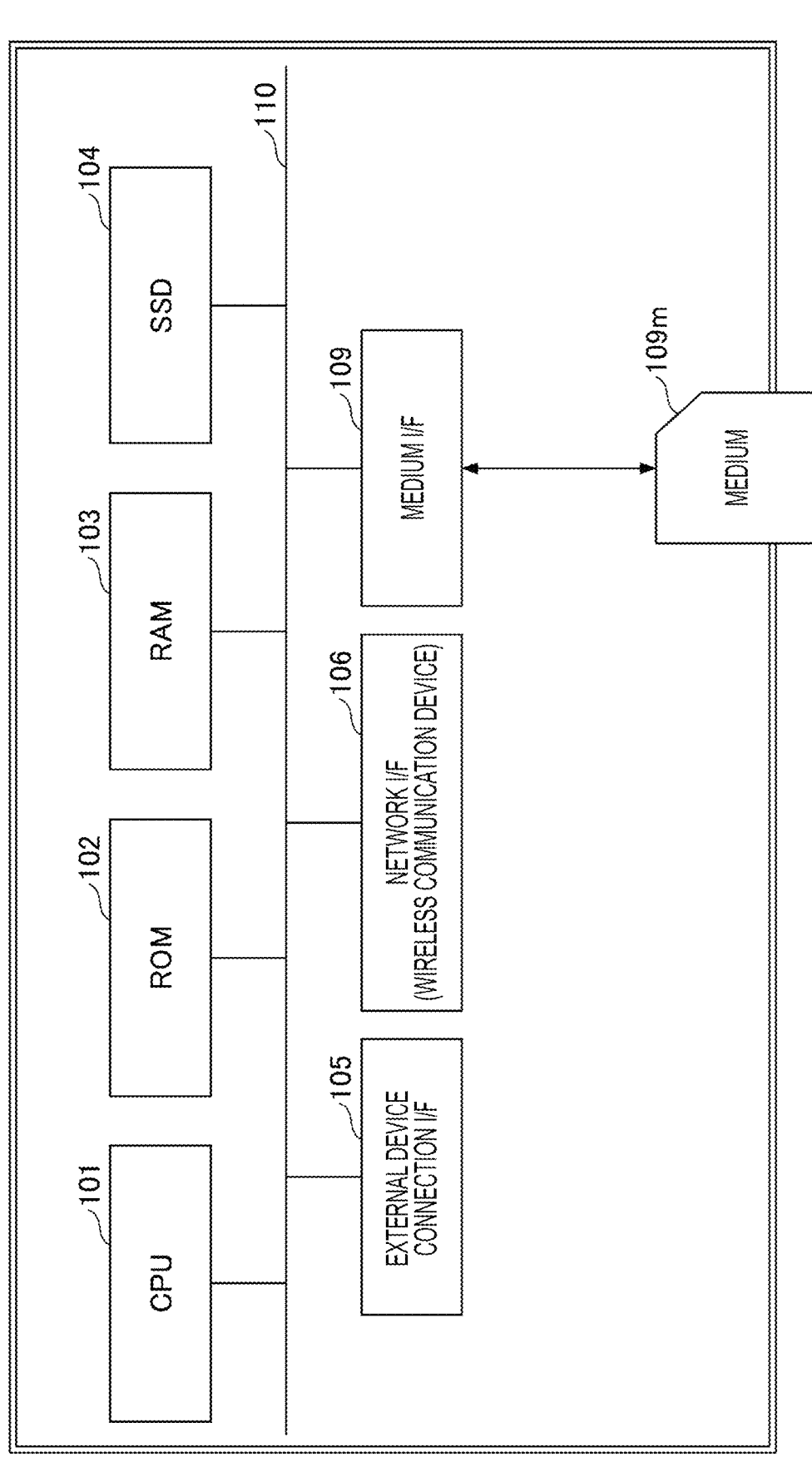
FIG. 3 is an electrical hardware configuration diagram of each device and a terminal according to the embodiment.

Next, electrical hardware configurations of the object distance setting device 2, the object detection probability calculating apparatus 5, the communication device 7, and the operator terminal 8 will be described with reference to FIG. 3. FIG. 3 is an electrical hardware configuration diagram of each device and the terminal according to the embodiment.

As illustrated in FIG. 3, the object detection probability calculating apparatus 5 includes, as a computer, a central processing unit (CPU) 101, a read only memory (ROM) 102, a random access memory (RAM) 103, a solid state drive (SSD) 104, an external device connection interface (I/F) 105, a network I/F 106, a medium I/F 109, and a bus line 110.

Among the components, the CPU 101 controls the overall operation of the object detection probability calculating apparatus 5. The ROM 102 stores a program such as an initial program loader (IPL) used for driving the CPU 101. The RAM 103 is used as a work area of the CPU 101.

The SSD 104 reads or writes various types of data under the control of the CPU 101. Note that a hard disk drive (HDD) may be used instead of the SSD 104.

The external device connection I/F 105 is an interface for connection with various external devices. Examples of the external devices in this case include a display, a speaker, a keyboard, a mouse, a universal serial bus (USB) memory, a printer, and the like.

The network I/F 106 is an interface for performing data communication via a communication network 100 or a Local area network (LAN). Note that a wireless communication device may be used instead of the network I/F 106.

The medium I/F 109 controls reading or writing (storing) of data from or in a recording medium 109*m* such as a flash memory. Examples of the recording medium 109*m* also include a digital versatile disc (DVD) and a Blu-ray Disc (registered trademark).

The bus line 110 is an address bus, a data bus, or the like for electrical connection with components such as the CPU 101 illustrated in FIG. 3.

Note that the object distance setting device 2, the communication device 7, and the operator terminal 8 have the same configurations as the configuration of the object detection probability calculating apparatus 5, and thus the description thereof will be omitted.

Modification Example of System Configuration of Embodiment

Figure 4:
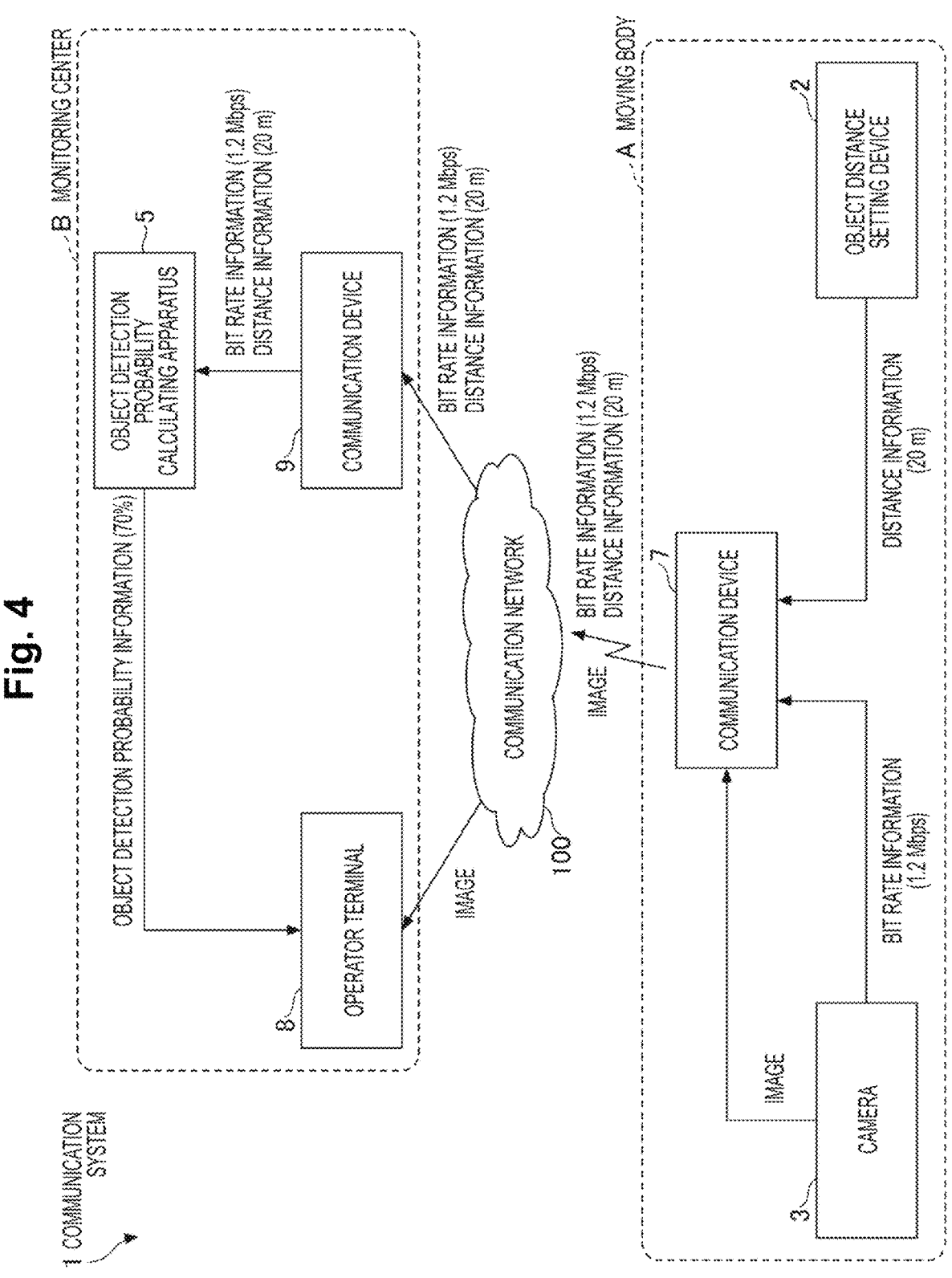
FIG. 4 is an overall configuration diagram of a communication system in a modification example according to the embodiment.

Here, a modification example of FIG. 1 will be described with reference to FIG. 4. Note that values (1.2 Mbps, 20 m, 70%) illustrated in FIG. 4 are an example, and the embodiment is not limited to the values. In the communication system 1 of FIG. 4, the object detection probability calculating apparatus 5 on the moving body A side is installed on the monitoring center B side, and accordingly, a communication device 9 is installed in the monitoring center B. The bit rate information transmitted from the camera 3 is transmitted to the object detection probability calculating apparatus 5 via the communication device 7 and the communication device 9. The distance information transmitted from the object distance setting device 2 is also transmitted to the object detection probability calculating apparatus 5 via the communication device 7 and the communication device 9. Further, the image data transmitted from the camera 3 is transmitted to the operator terminal 8 via the communication device 7. Note that the object distance setting device 2 may be provided on the monitoring center B side.

Processing or Operation of Communication System

Figure 5:
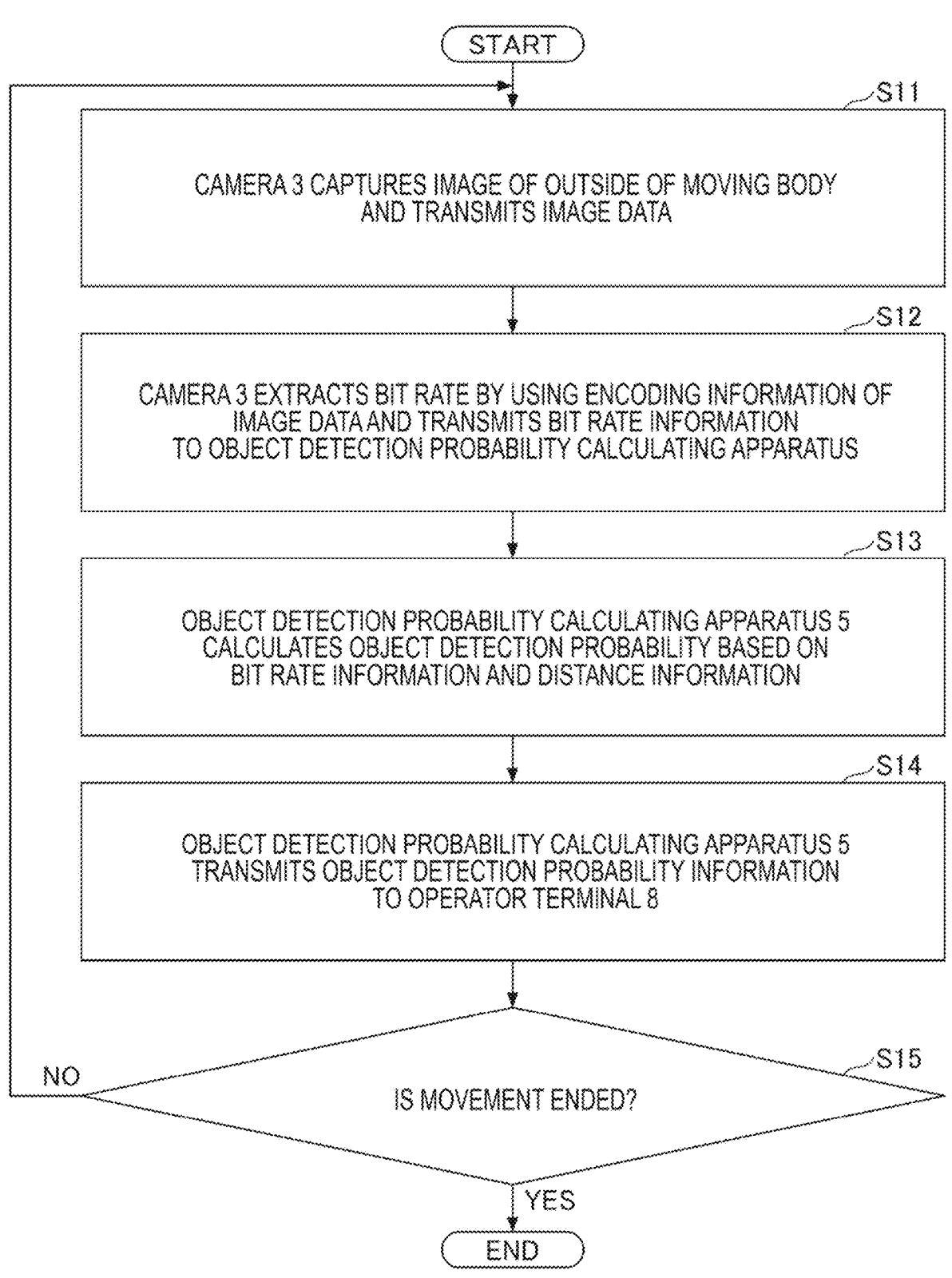
FIG. 5 is a flowchart illustrating processing of estimating and presenting the object detection probability.

Subsequently, processing or an operation of each device in the communication system 1 will be described with reference to FIGS. 5 and 6. FIG. 5 is a flowchart illustrating processing of estimating and presenting the object detection probability. FIG. 6 is a view illustrating a display screen example by the operator terminal in the monitoring center.

S11: The camera 3 captures an image of the outside of the moving body A to obtain image data, and then transmits the image data to the operator terminal.

S12: The camera 3 extracts the bit rate of the image by using encoding information of the image data, and transmits the bit rate information (for example, 1.2 Mbps) to the object detection probability calculating apparatus 5.

S13: The object detection probability calculating apparatus 5 calculates the object detection probability (for example, 70%) based on the bit rate information and the distance information (for example, 20 m) by using the model of the object detection probability as illustrated in FIG. 2.

S14: The object detection probability calculating apparatus 5 transmits object detection probability information indicating the object detection probability calculated by the object detection probability calculating apparatus 5 to the operator terminal 8.

As a result, as illustrated in FIG. 6, the operator terminal 8 displays, on a display, the image transmitted from each moving body in S11 and the object detection probability information related to the image of each moving body, which has been transmitted from the object detection probability calculating apparatus 5 in S14, in association with each other by screen division. Note that, in order to associate the image and the object detection probability information with each other, identification information such as an ID may be included in each of the image data and the object detection probability information. In this case, the camera 3 adds the identification information to the image data and the bit rate information to be output. Then, the object detection probability calculating apparatus 5 adds the identification information added to the bit rate information acquired from the camera 3 to the object detection probability information and outputs the result of the addition.

S15: In a case where the movement of the moving body A is not ended (NO), the process returns to S11. On the other hand, in a case where the movement of the moving body A is ended (YES), the processing illustrated in FIG. 5 is ended.

Detailed Calculation Method of Object Detection Probability

Next, the calculation method of the object detection probability performed by the object detection probability calculating apparatus 5 in the process of S13 will be described. Here, a method of obtaining an object detection probability dr using a bit rate br of an image and a distance d between the moving body A (or the camera 3) and the object will be described.

Image quality is correlated with the bit rate. The higher the bit rate, the higher the image quality. On the other hand, in a case where the bit rate reaches a predetermined value or greater, the quality of the image reaches almost an upper limit, and the object detection probability does not change even at a bit rate higher than the predetermined bit rate. Therefore, the object detection probability is calculated by using the model of the object detection probability in which the object detection probability increases as the bit rate increases, but the detection probability does not change when the bit rate is equal to or greater than a predetermined value (first predetermined value). In addition, calculation is performed by using the model of the object detection probability in which the object detection probability increases in a case where the distance between the moving body A (or the camera 3) and the object is equal to or smaller than a predetermined value (second predetermined value) (in a case where the distance is relatively short), and the detection probability is equal to or greater than a predetermined value even in a case where the bit rate is equal to or smaller than a predetermined value (third predetermined value) (in a case where the bit rate is relatively low). On the other hand, calculation is performed by using the model of the object detection probability in which the object detection probability decreases as the distance between the moving body A (or the camera 3) and the object increases, and the object detection probability is 0 in a case where the distance is equal to or greater than a predetermined value (fourth predetermined value) (in a case where the distance is too long). Using a mathematical expression satisfying these conditions, the object detection probability is calculated by any one of the following mathematical expressions. Note that the detection probability is defined in a range of 0 to 1, and, in each of the following expressions, the object detection probability is defined as 0 in a case where the object detection probability dr is equal to or smaller than 0, and the object detection probability is defined as 1 in a case where dr is equal to or greater than 1. In each expression, $a_1$ to $a_5$ are coefficients different for each expression, and e represents the base of the natural logarithm. Note that the expression used for calculating the object detection probability is not limited to the following expressions.

(Expression 1)

$$dr = \frac{(a_1 - a_2)}{1 + \exp\dfrac{br - a_3}{a_4}} + a_2 - a_5 \times e^d \qquad \text{[Math. 1]}$$

(Expression 2)

$$dr = a_1\left(1 - b^{(br - a_2)}\right) + a_3 \times d \qquad \text{[Math. 2]}$$

(Expression 3)

$$dr = a_1 + a_2\left(1 - \exp\left(-\frac{br}{a_3 \times d}\right)\right) + a_4\left(1 - \exp\left(-\frac{br}{a_5 \times d}\right)\right) \qquad \text{[Math. 3]}$$

(Expression 4)

$$dr = -\left(a_1 + a_2\exp\left(-\frac{br}{a_3 \times d}\right)\right) \qquad \text{[Math. 4]}$$

(Expression 5)

$$dr = a_1 + \frac{(a_2 - a_1)(br - a_3 \times d)^{a_4}}{a_5^{a_4} + (br - a_3 \times d)^{a_4}} \qquad \text{[Math. 5]}$$

(Expression 6)

$$dr = \left((1 - a_3 \times e^d) - a_1\right) * \frac{(br^{a_2})}{a_4^{a_2} + (br^{a_2})} \qquad \text{[Math. 6]}$$

(Expression 7)

$$dr = (1 - a_3 \times e^d) - \frac{(1 - a_3 \times e^d) - a_4}{\left(1 + \dfrac{br}{a_1 \times e^d}\right)^{a_2}} \qquad \text{[Math. 7]}$$

(Expression 8)

$$dr = \frac{a_1}{1 + \exp A(d - x_0)} \qquad \text{[Math. 8]}$$

However, A and $x_0$ in Expression 8 are expressed as follows.

$$A = -c_1 \times \log(c_2 + br) + c_3$$

$$x_0 = b_1 \times \log(b_2 + br) + b_3$$

Alternatively, A may be expressed as follows.

$$A = c_1 \times \exp(-(c_2 \times x_0) - c_3) + c_4$$

Here, $a_1$, $b_1$ to $b_3$, and $c_1$ to $c_4$ in (Expression 8) are coefficients, respectively.

Effects of Embodiment

As described above, according to the present embodiment, it is possible to obtain and present the detection probability of the object by the operator in the monitoring center B. As a result, since the monitoring image from each moving body and the object detection probability information of this monitoring image are displayed in association with each other on the operator terminal 8 in the monitoring center B as illustrated in FIG. 6, it is possible to eliminate an occurrence of a situation in which the operator does not notice that the image quality of the monitoring image is deteriorated.

Supplementary Notes

As described above, the present invention is not limited to the above-described embodiment, and various modifications and applications can be made, for example, as will be described below.

(1) In the above embodiment, the camera 3 outputs the bit rate information, and the object detection probability calculating apparatus 5 calculates the object detection probability by using the bit rate information, but the present invention is not limited thereto. For example, instead of the bit rate information, the camera 3 may output resolution information indicating the resolution of the image or frame rate information indicating the frame rate of the image, and the object detection probability calculating apparatus 5 may calculate the object detection probability by using the resolution information or the frame rate information. Note that the bit rate information, the resolution information, and the frame rate information are examples of a parameter of the image quality.

(2) Although each device can be implemented by a computer and a program, the program can also be provided by being recorded in a (non-transitory) recording medium or via the communication network such as the Internet.

(3) The number of CPUs 101 is not limited to one, and may be plural.

RELATIONSHIP WITH BASIC APPLICATION

The present patent application claims the priority based on International Patent Application PCT/JP2022/029392 filed on Jul. 29, 2022, and the entire contents of International Patent Application PCT/JP2022/029392 are incorporated herein by reference.

REFERENCE SIGNS LIST

1 Communication system
A Moving body
B Monitoring center
2 Object distance setting device
3 Camera (example of image capturing unit)
5 Object detection probability calculating apparatus
7 Communication device
8 Operator terminal
9 Communication device
100 Communication network

The invention claimed is:

1. An object detection probability calculating apparatus for remotely monitoring automatic driving of a moving body, comprising:
a processor; and
a memory storing instructions that cause the processor to execute a process, the process including
calculating an object detection probability indicating a probability at which a person is able to detect a predetermined object appearing in an image, based on a parameter of image quality acquired from a camera provided at a moving body capable of automatic movement and distance information indicating a distance from the moving body or the camera to the predetermined object;
determining whether the calculated object detection probability is below a predetermined threshold; and stopping automatic driving of the moving body upon determining that the calculated object detection probability is below the predetermined threshold.

2. The object detection probability calculating apparatus according to claim 1, wherein the object detection probability is calculated based on the parameter and the distance information by using a model of the object detection probability, the model indicating a relationship between a value of the parameter and the object detection probability.

3. The object detection probability calculating apparatus according to claim 2, wherein the model is a model in which the object detection probability increases as the parameter increases, and the object detection probability does not change when the parameter is equal to or greater than a first predetermined value; in which the object detection probability increases in a case where the distance is equal to or smaller than a second predetermined value, and the object detection probability is equal to or greater than a certain value even in a case where the parameter is equal to or smaller than a third predetermined value; and in which the object detection probability decreases as the distance increases, and the object detection probability is 0 in a case where the distance is equal to or greater than a fourth predetermined value.

4. The object detection probability calculating apparatus according to claim 1, wherein the parameter is a bit rate, a resolution, or a frame rate related to the image.

5. The object detection probability calculating apparatus according to claim 1, wherein the process further includes transmitting object detection probability information indicating the calculated object detection probability, to an operator terminal for remotely monitoring movement of the moving body.

6. The object detection probability calculating apparatus according to claim 1, wherein the object detection probability calculating apparatus is installed at the moving body or installed in a monitoring center in which an operator terminal for remotely monitoring movement of the moving body is installed.

7. The object detection probability calculating apparatus according to claim 1, wherein the process further comprises:
initiating an operation of the moving body based on an instruction from an operator remotely upon an end of automatic driving of the moving body.

8. An object detection probability calculating method for remotely monitoring automatic driving of a moving body, comprising:
calculating an object detection probability indicating a probability at which a person is able to detect a predetermined object appearing in an image, based on a parameter of image quality acquired from a camera provided at a moving body capable of automatic movement and distance information indicating a distance from the moving body or the camera to the predetermined object;
determining whether the calculated object detection probability is below a predetermined threshold; and
stopping automatic driving of the moving body upon determining that the calculated object detection probability is below the predetermined threshold.

9. A non-transitory computer-readable recording medium having computer-readable instructions stored thereon, which when executed, cause a computer to perform the object detection probability calculating method according to claim 8.

* * * * *